United States Patent [19]

Authier

[11] Patent Number: 4,916,581
[45] Date of Patent: Apr. 10, 1990

[54] ROTOR BLADE ILLUMINATION DEVICE

[76] Inventor: Ricky J. Authier, 1327 Creso Rd. South, Spanaway, Wash. 98387

[21] Appl. No.: 190,480

[22] Filed: May 4, 1988

[51] Int. Cl.$^4$ .............................................. B64D 47/02
[52] U.S. Cl. ........................................ 362/34; 362/62; 340/946
[58] Field of Search ..................... 362/34, 62; 340/115, 340/946; 244/17.11, 17.17; 116/202; 252/700

[56] References Cited

U.S. PATENT DOCUMENTS

| | | | |
|---|---|---|---|
| 2,423,528 | 7/1947 | Stewart | 244/17.11 |
| 3,174,552 | 3/1965 | Soucy, Jr. | 362/62 |
| 3,395,875 | 8/1968 | Donovan | 244/17.11 |
| 3,539,794 | 11/1970 | Rauhut et al. | 240/2.25 |
| 3,576,987 | 5/1971 | Voight et al. | 362/34 |
| 3,597,362 | 8/1971 | Bollyky et al. | 252/186 |
| 3,710,311 | 1/1973 | Avital | 362/62 |
| 3,723,722 | 3/1973 | Van Iderstine et al. | 362/62 |
| 3,819,925 | 6/1974 | Richter et al. | 362/34 |
| 3,846,023 | 11/1974 | Wilkin | 362/62 |
| 4,129,311 | 12/1978 | Hodgson et al. | 362/34 |
| 4,613,096 | 9/1986 | Pugh | 244/17.11 |
| 4,640,193 | 2/1987 | Koroscil | 362/34 |
| 4,737,788 | 4/1988 | Kennedy | 342/29 |

OTHER PUBLICATIONS

Flight International, 9/13/80, p. 1073, Illustration of Aerospatiale Twin Squirrel Helicopter.

Primary Examiner—Ira S. Lazarus
Assistant Examiner—R. R. Cole
Attorney, Agent, or Firm—Glenn D. Bellamy

[57] ABSTRACT

Disclosed is a device for providing illumination on a helicoptor rotor blade. A chemiluminescent light source, including a translucent container and a chemiluminescent substance received therein, is attached to the outer end of a helicoptor rotor blade so that the helicoptor operator, or a remote observer, may be provided with a light marker indicating the outer circumference of the blade's rotational path.

14 Claims, 3 Drawing Sheets

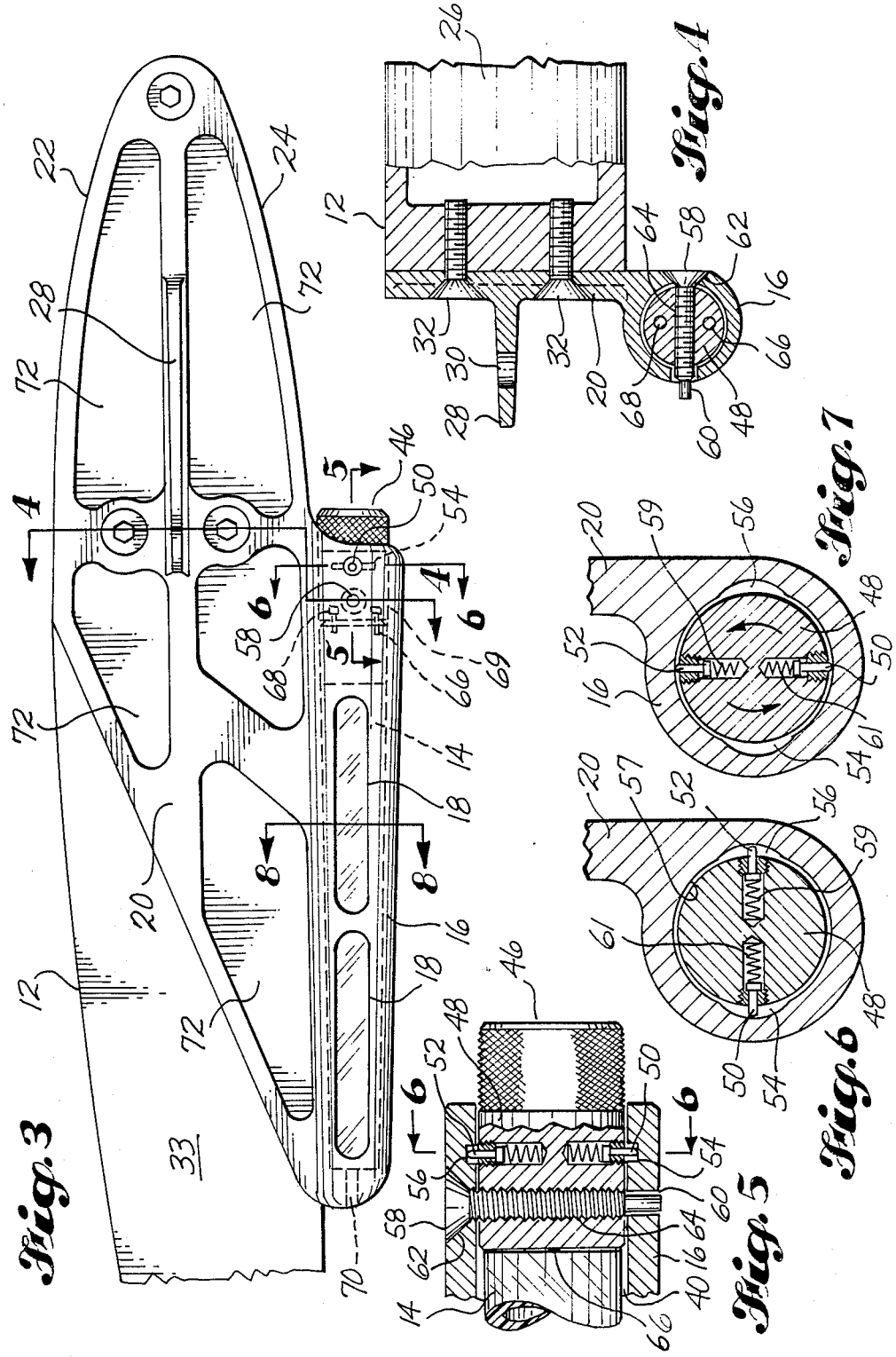

ROTOR BLADE ILLUMINATION DEVICE

TECHNICAL FIELD

This invention relates to aircraft warning lights, and more particularly to lights which are mounted directly to aircraft and/or helicopters for indicating location and position.

BACKGROUND ART

The use of warning lights on aircraft is well known. Such lights are typically attached to aircraft extremities such as wing tips or tail sections and are illuminated at night so that the aircraft can be seen. Warning lights for helicopters pose a slightly different problem than for fixed wing aircraft in that the outer extremities of a helicopter are mostly defined by its whirling rotor blade.

It goes without saying that helicopters are highly maneuverable aircraft and certain kinds of rescue and/or military operations involve their use in areas where space is limited, perhaps by the existence of trees, buildings, or the presence of other helicopters. A person familiar with helicopter technology knows that collision of a rotor blade with virtually anything is typically a catastrophic event. It is important, therefore, that the helicopter operator or pilot is aware of the position of the blade's outer perimeter. During night operations it is difficult or impossible for the pilot to accurately determine this, which has been known to cause numerous accidents.

Past attempts have been made at solving this problem by placing electric lights at the rotor's tip so that the blade's perimeter is easily visible. Also, there have been attempts to develop tip-mounted radar devices which electronically sense objects near the rotor, such as the device disclosed in U.S. Pat. No. 4,737,788. However, these attempts have not met with practical results, primarily because it is difficult to design relatively complex electrical systems that can structurally weather the high forces present on the rotor blade as it whirls. As will become apparent, the present invention provides a simple, workable design that is believed to be the first practical device known in the art for placing warning lights at the blade's tip.

DISCLOSURE OF THE INVENTION

The present invention provides illumination at the end of a helicopter rotor blade by attachment of a chemiluminescent light source to the blade's tip. In basic form, it includes a translucent, semi-flexible container having two compartments divided by a frangible internal wall. Separate chemical components of a chemiluminescent substance are placed in each compartment. These components are chemically stable so long as they remain physically separated. When combined, a chemiluminescent reaction occurs which creates a substance that emits light.

The container is attached to the blade's tip by an elongated tubular housing having a hollow space shaped for receiving the container. The housing extends transversely along the lower edge of the blade's tip and has an opening leading into the space for placement of the container inside. Normally, this end opening faces the direction of blade rotation. Prior to placing the container inside, the user first flexes the container sufficiently to cause the frangible inner wall to break. This mixes the chemical components and, as described above, creates or generates light that is emitted through the walls of the container. Then, the container is placed in the housing and a closure member plugs the housing's end opening, thus securing it inside.

The housing is mounted to the blade's tip by a bracket that is connected to an outward facing surface of the blade's tip. This surface has a perimeter defined by the tip's leading and trailing edges, and part of the bracket has an edge that generally corresponds to the curvature of the tip's leading edge.

Apertures in the housing permit the container's light to be viewed either inwardly or outwardly depending on their location in the sidewalls of the housing. Preferably, there is at least one aperture directed in either direction, so that the light emitted is seen by both the helicopter operator and others at a remote location.

The chemiluminescent reaction does not last indefinitely, but will typically last sufficiently long to cover the duration of any typical helicopter flight, whether it be during the day or night, although it should be appreciated the invention is designed primarily for night use. Afterward, the used container is easily removed and replaced by a new one for subsequent operations.

The invention as disclosed above will become better understood upon consideration of the following description when taken in conjunction with the drawings.

BRIEF DESCRIPTION OF THE DRAWING

Referring to the several figures of the drawing, wherein like reference numerals indicate like parts throughout the various views, and wherein:

FIG. 3 is an end elevational view of the embodiment shown in FIG. 1;

FIG. 4 is a sectional view taken substantially along line 4—4 of FIG. 3, and shows the attachment of the invention to the blade's tip;

FIG. 5 is an enlarged fragmentary sectional view of an end opening closure member and is taken substantially along line 5—5 of FIG. 3;

FIG. 6 is an enlarged fragmentary sectional view of the member shown in FIG. 5, taken substantially along line 6—6 of FIGS. 3 and 5;

FIG. 7 is a view like FIG. 6, but shows the closure member rotated 90°;

BEST MODE FOR CARRYING OUT THE INVENTION

Figure 1:
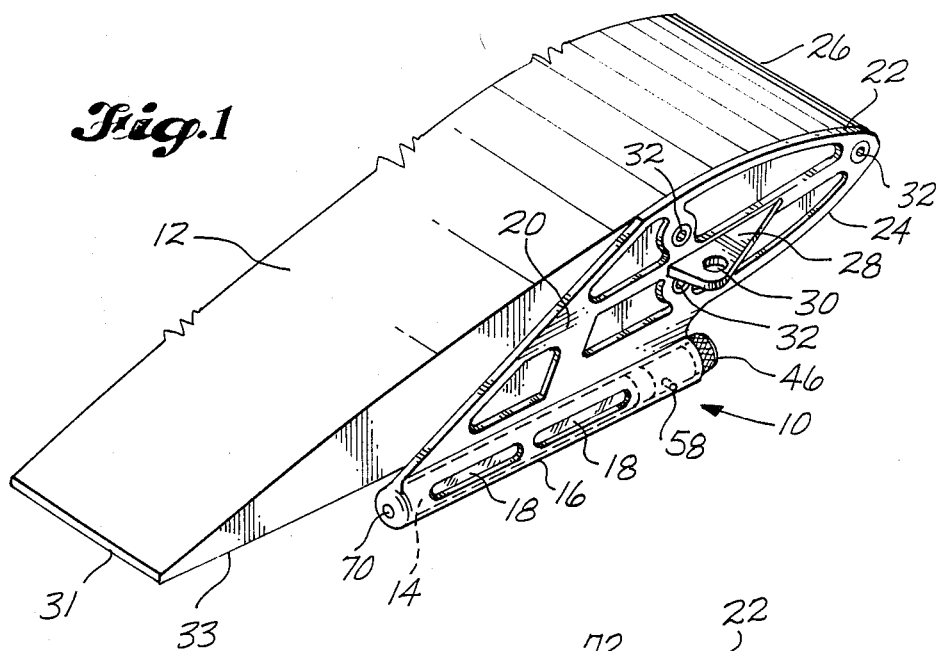
FIG. 1 is a pictorial view of a preferred embodiment of the invention, and shows the invention attached to an outward end surface of a helicopter rotor blade.

Referring now to the drawings, and first to FIG. 1, therein is shown at 10 a preferred embodiment of a rotor blade illumination or warning device attached to the outward end of a helicopter rotor blade 12. The device 10 includes a chemiluminescent light source 14 enclosed within a housing portion (hereafter "housing") 16. The housing 16 has apertures 18, 18' which allow outward emission of light from the source 14.

The housing 16 is attached to the blade's tip by a bracket portion (hereafter "bracket" 20). The leading and trailing edges 26, 31 of the blade's tip define an outwardly facing surface 33. Normally, this surface 33 would be covered by a conventionally-known rotor blade tip cap. In order to practice the present invention, this cap is first removed and the bracket 20 is secured directly to surface 33 by screws 32. The bracket has outer edges 22, 24 which correspond to the leading edge 26 of the blade's tip.

Figure 8:
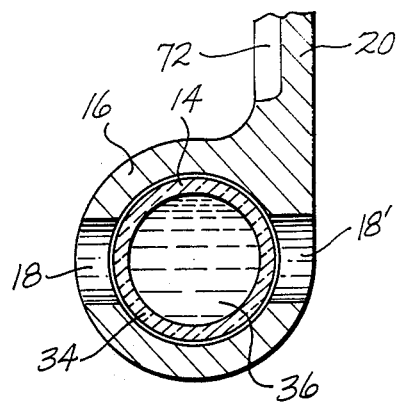
FIG. 8 is a view like FIG. 6 but is taken substantially along line 8—8 of FIG. 3.

Directing attention now to FIG. 8, the light source 14 is preferably in the form of an elongated, tapered translucent container 34. This container holds a chemiluminescent substance 36 that is created in the manner which was described above, and which is conventionally known and has been previously published in U.S. Pat. Nos. 3,539,794 and 3,597,362. Chemiluminescent lighting devices like the container 34 are currently sold under the trademark CYALUME ® by American Cyanamid Company of Stamford, Conn.

The housing 16 has a hollow space that is sized for receiving the tapered container 34. Preferably, the space also is tapered so that the container 34 is snuggly received therein. The container 34 is inserted into space 40 through an opening 44 at one end of the housing 16. This end opening 44 normally faces the direction of blade rotation, which would tend to cause the container 34 to be jammed into space 40. In order to prevent this, the container's sidewall has an annular shoulder 38 adjacent its wide end which abuts against a similar shoulder 42 in space 40. This ensures the container 34 can only go so far into the space 40. The housing's opposite end 45 is closed, with the exception of a small opening 70. This latter opening 70 permits a pin or similar member to be thrust against the small end of the container 34 in order to push it out of space 40 for easy removal of the container 34 from the housing 16.

Figure 2:
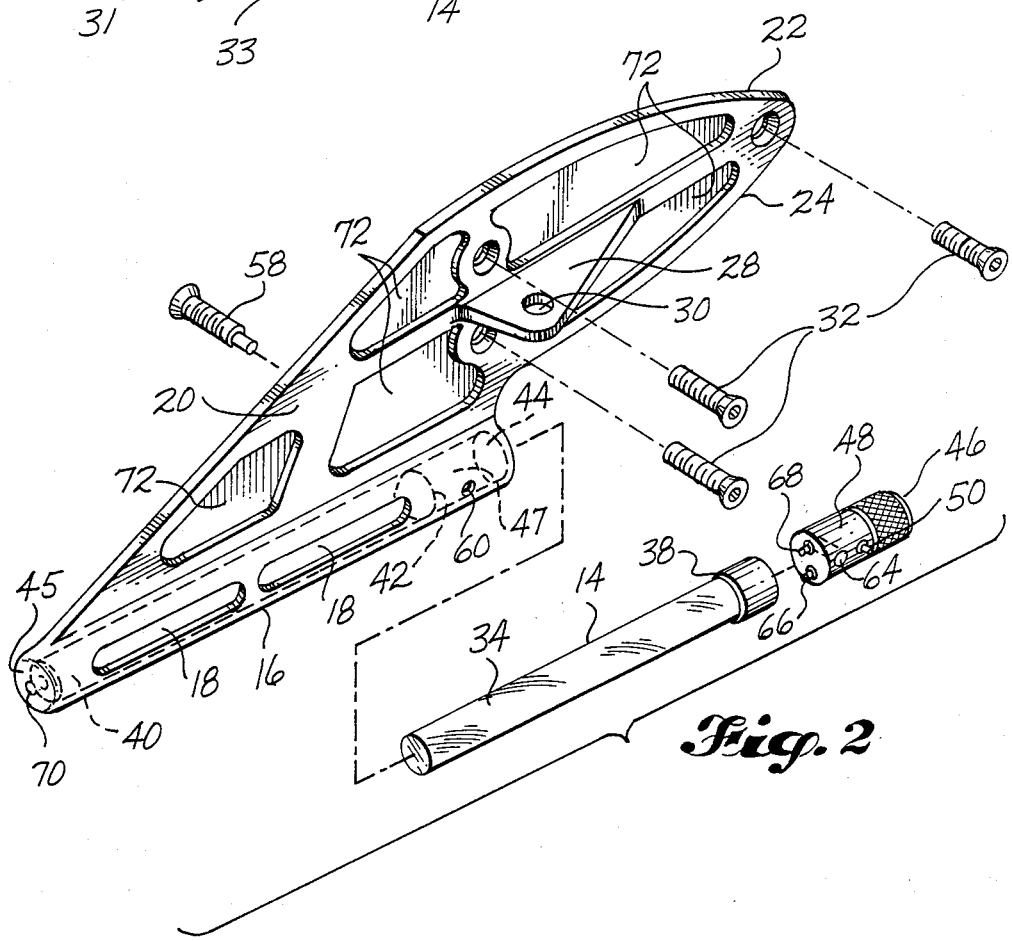
FIG. 2 is an exploded pictorial view of the preferred embodiment shown in FIG. 1.

The container 34 is secured in the housing 12 by a closure member or plug 46. This member 46 is nearly cylindrical in form and has a body 48 shaped for sliding insertion through housing end opening 44. This body 48 is received in an outer end area 47 (see FIG. 2) of space 40. Referring to FIGS. 6 and 7, the plug's body 48 has a pair of laterally extending compressible detent members 50, 52 which are received within diametrically opposed grooves 54, 56 formed in the housing's inner sidewalls 57 adjacent end space area 47. As the plug 46 is inserted through housing end opening 44, the detent members 50, 52 are compressed by the sidewalls until they reach grooves 54, 56. Then, springs 59, 61 in the plug 46 push the detent members outwardly and into the grooves, thus holding the plug 46 in place. The grooves 54, 56 do not circumferentially surround the plug 46, thus permitting it to be twisted so that the housing's sidewalls press the detent members, which permits removal of the plug 46.

As an added safety feature, to prevent unintentional disengagement of the plug 46 a threaded lock pin 58 is inserted transversely through opposing openings 60, 62 in opposite sidewalls of the housing, and through an internally threaded transverse opening 64 in the plug's body 48. The body opening 64 is in registration with openings 60, 62 when the plug's detent members 50, 52 are engaged with grooves 54, 56. Screwing pin 58 through this opening 64 ensures the plug 46 cannot be removed.

The plug 46 further includes a pair of axially directed spring-biased pressure members 66, 68 which bear against the container's wide end 69 (see FIG. 3). These members ensure that the container 34 will be held snuggly in space 40 and eliminates the possibility of back and forth oscillating movement by the container 34 as the blade rotates.

Figure 9:
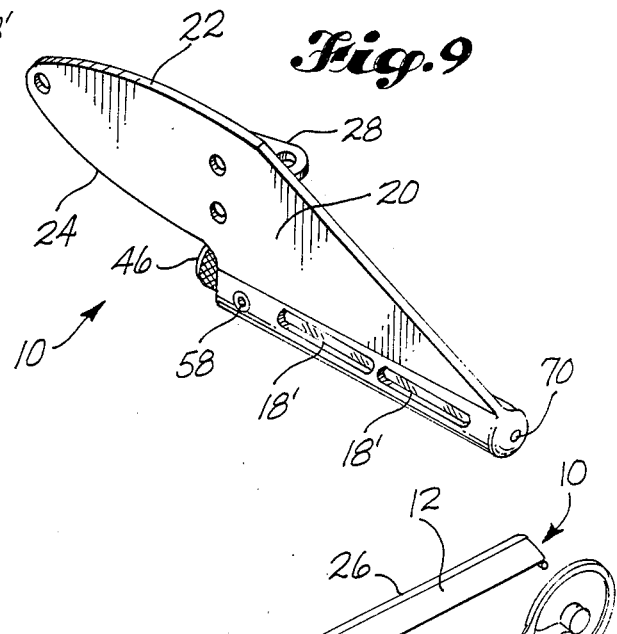
FIG. 9 is a pictorial view of an inner side of the preferred embodiment of the invention, looking at the side opposite from that which is shown in FIG. 1.
Figure 10:
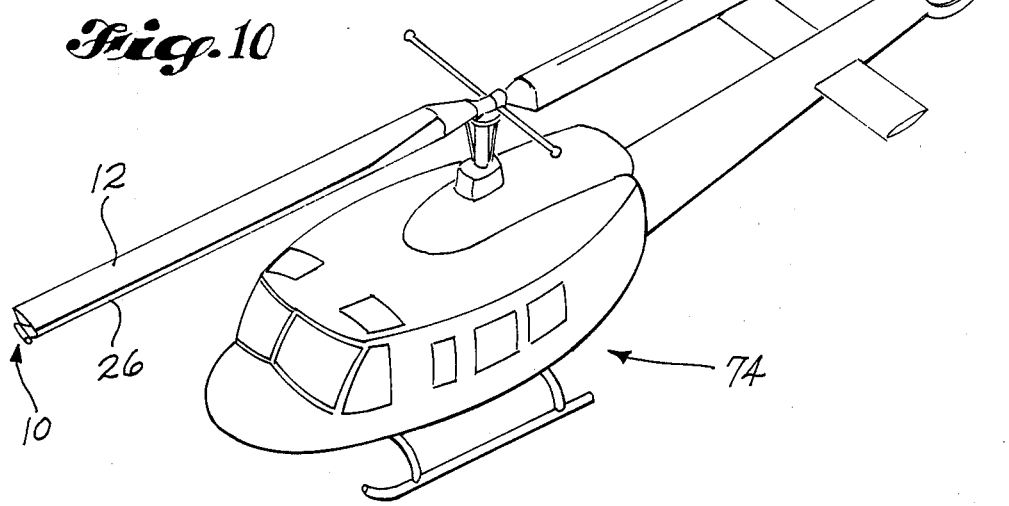
FIG. 10 is a pictorial view of a helicopter and shows the location of the invention with respect to the blade's tip.

The housing apertures 18, 18' may be selectively located so that light can be emitted either inwardly or outwardly with respect to the helicopter. This will depend on the application in which the invention is used. Substantially all of the housing 16 is positioned below the lower surface of the rotor blade. Preferably, the housing should always have at least one aperture 18' positioned to direct light inwardly, so that it is visible to the helicopter's operator (see FIG. 9). Because of the relatively high rotational speed of the blade, this light will appear to the operator as a ring of light that defines the blade's perimeter. It is also preferable that at least one aperture 18 be positioned on the outer side of the housing so that the same ring can be seen by others. In certain kinds of police and military operations it may be desirable to eliminate the outer apertures. Alternatively, the light source 14 can be designed to emit light in either the visible or invisible infrared spectrum. In the latter case, of course, suitable infrared goggles would need to be worn by the operator in order to see the rotor's tip.

The bracket 20 is preferably integrally formed with the housing 16 and is constructed to provide a rigid attachment of the housing to the blade 12. It is to be understood that the specific shape of the bracket 20 may vary according to individual helicopter model. Preferably, the bracket will have a portion or member 28 which extends radially outwardly, and which has an opening 30. This would provide a tie-down location for the blade 26. Also, the bracket 20 may include certain recessed areas 72 which serve to reduce its overall weight.

It is to be appreciated that the embodiment of the invention described above is the current best mode for carrying out the invention. Obviously, certain changes could be made to the invention without departing from its overall spirit and scope. Nothing in the above description is meant to be taken in the limiting sense, at least from the standpoint of the scope of allowable patent protection due to the applicant or his assignees. The scope of such protection is to be defined solely by the following claims, wherein such claims are to be interpreted in accordance with the well-established doctrines of patent claim interpretation.

What is claimed is:

1. A device for providing illumination on a helicopter rotor blade, comprising:

a chemiluminescent light source, including an elongated translucent container tapering in cross-section from substantially one end to another and a chemiluminescent substance within said container; and means for attaching said light source adjacent the outward end of said helicopter rotor blade such that said light source is viewable by an operator of said helicopter;

wherein said attaching means includes:

a housing portion having an elongated hollow space shaped to receive said container, and an end opening leading into said space for insertion and removal of said container to and from said space, said space decreasing in cross-section from said end opening to an opposite end such that said container is snuggly received therein and said end opening is directed substantially toward the rotor blade's direction of rotation, and means for opening and closing said end opening to permit such insertion and removal, said housing portion further having at least one aperture through a sidewall thereof to allow outward emission of light from said light source, and a bracket portion attached to said housing portion, and bracket portion being shaped for attachment to said outward end of said rotor blade.

2. A device for providing illumination on a helicopter rotor blade, comprising:

a chemiluminescent light source, including a translucent container and a chemiluminescent substance within said container, and means for attaching said light source adjacent the outward end of said helicopter rotor blade such that said light source is viewable by an operator of said helicopter, said attaching means including a housing portion having a hollow space shaped to receive said container, and an end opening leading into said space for insertion and removal of said container to and from said space, and means for opening and closing said end opening to permit such insertion and removal, said housing portion further having at least one aperture through a sidewall thereof to allow outward emission of light from said light source, and a bracket portion attached to said housing portion, said bracket portion being shaped for attachment to said outward end of said rotor blade, wherein said end opening in said housing is directed toward the blade's direction of rotation.

3. A device for providing illumination on a helicopter rotor blade, comprising:

a chemiluminescent light source, including a translucent container and a chemiluminescent substance within said container, and means for attaching said light source adjacent the outward end of said helicopter rotor blade such that said light source is viewable by an operator of said helicopter, said attaching means including a housing portion having a hollow space shaped to receive said container, and an end opening leading into said space for insertion and removal of said container to and from said space, and means for opening and closing said end opening to permit such insertion and removal, said housing portion further having at least one aperture through a sidewall thereof to allow outward emission of light from said light source, and a bracket portion attached to said housing portion, said bracket portion being shaped for attachment to said outward end of said rotor blade, wherein said housing is positioned along a bottom dge of said outward end, in a manner so that substantially most of said housing is visible below said rotor blade from the normal location of an operator of said helicopter.

4. The device of claim 3, wherein said end opening in said housing is directed toward the blade's direction of rotation.

5. The device of claim 3, wherein said light source emits light in the infrared spectrum and substantially no light in the visible spectrum.

6. A device for providing illumination on a helicopter rotor blade, comprising:

a chemiluminescent light source, including a translucent container and a chemiluminescent substance within said container, and means for attaching said light source adjacent the outward end of said helicopter rotor blade such that said light source is viewable by an operator of said helicopter, said attaching means including a housing portion having a hollow space shaped to receive said container, and an end opening leading into said space for insertion and removal of said container to and from said space, and means for opening and closing said end opening to permit such insertion and removal, said housing portion further having at least one aperture through a sidewall thereof to allow outward emission of light from said light source, and a bracket portion attached to said housing portion, said bracket portion being shaped for attachment to said outward end of said rotor blade, wherein said rotor blade end has a radially outwardly facing surface whose perimeter is defined by the profile of the blade's leading and trailing edges at the blade's tip, and said bracket portion is attached to said outwardly facing surface, with said bracket portion having an outer edge portion whose profile is substantially similar to said blade tip's leading edge profile, wherein said bracket portion includes a tie-down portion extending radially outwardly away from said bracket portion, said tie-down portion having an opening formed therethrough.

7. A device for providing illumination on a helicopter rotor blade, comprising:

a chemiluminescent light source, including a translucent container and a chemiluminescent substance within said container;

means for attaching said light source adjacent the outward end of said helicopter rotor blade, wherein said attaching means includes:

a housing portion having a hollow space shaped to receive said container, and an end opening leading into said space for insertion and removal of said container to and from said space, and means for opening and closing said end opening to permit such insertion and removal, said housing portion further having at least one aperture through a sidewall thereof to allow outward emission of light from said light source, and a bracket portion attached to said housing portion, said bracket portion being shaped for attachment to said outward end of said rotor blade, wherein said hollow space is elongated and tapers from a smaller to a larger diameter approaching said end opening, said housing portion further including diametrically opposed grooves formed in inner sidewalls thereof, said grooves being positioned adjacent an end space area of said hollow space, wherein said end space area portion is positioned immediately inside said end opening, and still further, said opening and closing means includes a closure member having a body portion sized to be received through said end opening and into said end space area, said closure member including first and second compressible detent members extending laterally outwardly from opposite sides of said closure member, said detent members being positioned for engagement in said grooves when said closure member is received in said end space area.

8. The device of claim 7, wherein said housing portion is positioned along a bottom edge of said blade's outward end so that substantially most of said housing is visible below said rotor blade from the normal position of an operator of said helicopter.

9. The device of claim 7, wherein said closure member includes at least one spring biased member positioned to inwardly bear against an end of said container when said closure member is in place within said end space portion.

10. The device of claim 9, wherein said housing portion further includes a pair of openings in registration with each other, one each extending through opposite sides of said housing portion and adjacent said end space portion, and said closure member includes a transverse opening positioned so that said transverse opening may be brought into registration with said pair of openings when said closure member is received within said end space portion, and a locking pin positioned through said sidewall and closure member openings.

11. A device for providing illumination on a helicopter rotor blade, comprising:

a chemiluminescent light source, including a translucent container and a chemiluminescent substance within said container, and means for attaching said light source adjacent the outward end of said helicopter rotor blade such that said light source is viewable by an operator of said helicopter, said attaching means including a housing portion having a hollow space shaped to receive said container, and an end opening leading into said space for insertion and removal of said container to and from said space, and means for opening and closing said end opening to permit such insertion and removal, said housing portion further having at least one aperture through a sidewall thereof to allow outward emission of light from said light source, and a bracket portion attached to said housing portion, said bracket portion being shaped for attachment to said outward end of said rotor blade, wherein said housing portion is positioned along a bottom edge of said blade's outward end so that substantially most of said housing is visible below said rotor blade from the normal position of an operator of said helicopter, and wherein said at least one aperture is positioned in said housing in a manner so as to allow light emitted by said chemiluminescent material to be directed inwardly toward said helicopter.

12. The device of claim 11, wherein said rotor blade end has a radially outwardly facing surface whose perimeter is defined by the profile of the blade's leading and trailing edges at the blade's tip, and said bracket portion is attached to said outwardly facing surface, with said bracket portion having an outer edge portion whose profile is substantially similar to said blade tip's leading edge profile.

13. A device for providing an anti-collision light at the end of a helicopter rotor blade for use during night operation, comprising:

an elongated translucent container, a light-emitting chemiluminescent material within said container, a tubular housing having an elongated hollow space shaped to receive said container, and an end opening directed substantially toward the blade's direction of rotation, for permitting insertion and removal of said container to and from said space, a closure member operable to close said end opening so that said container may be secured within said space, and a mounting bracket connected to said housing, and being attached to an outward end surface of the rotor blade, said bracket having an outer edge whose profile is substantially similar to the profile of at least a portion of the leading edge of said end surface, and wherein said housing and said container are positioned adjacent a bottom edge of said end surface, in a manner so that said housing can be seen from a position inward of and below said blade's end, said housing further having at least one aperture through a sidewall thereof, to permit outward emission of light from said chemiluminescent material, wherein said aperture is positioned to permit light emission such that an operator and ground crew within a zone of potential collision with the rotor have a visual indication of an outer perimeter of said rotor's path.

14. The device of claim 13, wherein said chemiluminescent material emits light in the infrared spectrum and substantially no light in the visible spectrum such that said visual indication is visible substantially only to an observer utilizing a night vision light amplification device.

* * * * *

UNITED STATES PATENT AND TRADEMARK OFFICE
CERTIFICATE OF CORRECTION

PATENT NO. : 4,916,581
DATED : April 10, 1990
INVENTOR(S) : Ricky J. Authier

It is certified that error appears in the above-identified patent and that said Letters Patent is hereby corrected as shown below:

Claim 1, column 5, line 14, "and bracket" should be -- said bracket --.

Claim 3, column 5, line 65, "dge" should be -- edge --.

Signed and Sealed this

Ninth Day of July, 1991

Attest:

HARRY F. MANBECK, JR.

Attesting Officer

Commissioner of Patents and Trademarks